United States Patent [19]

Plamper et al.

[11] Patent Number: 4,923,252

[45] Date of Patent: May 8, 1990

[54] TIRE ASSEMBLY

[75] Inventors: Gerhard R. Plamper; Alan Borling, both of Valley City, Ohio

[73] Assignee: MTD Products, Inc., Cleveland, Ohio

[21] Appl. No.: 305,377

[22] Filed: Feb. 1, 1989

Related U.S. Application Data

[63] Continuation-in-part of Ser. No. 203,020, Jun. 1, 1988, abandoned.

[51] Int. Cl.⁵ .............................................. B60B 5/02
[52] U.S. Cl. ........................... 301/63 PW; 280/243; 301/6 D; 152/323
[58] Field of Search ................. 301/1, 5 R, 6 R, 6 D, 301/63 PW, 111; 152/1, 323, 324, 327, 328, 329, 379.4, 384, 151; 280/11.21, 243, 245, 251, 255

[56] References Cited

U.S. PATENT DOCUMENTS

| 1,459,573 | 6/1923 | Cleveland | 280/243 |
| 1,750,187 | 3/1930 | Miller et al. | 280/255 X |
| 1,865,432 | 7/1932 | Bossert | 152/384 X |
| 2,049,345 | 7/1936 | Young | 280/243 X |
| 2,639,929 | 5/1953 | Cooper | 301/6 D X |
| 3,894,776 | 7/1975 | Black | 301/63 PWX |
| 4,170,384 | 10/1979 | Rotheiser | 301/63 PW |
| 4,362,202 | 12/1982 | Sacks | 152/329 X |

FOREIGN PATENT DOCUMENTS 180921  2/1907  Fed. Rep. of Germany ... 280/11.21

Primary Examiner—Russell D. Stormer
Attorney, Agent, or Firm—Woodling, Krost & Rust

[57] ABSTRACT

An axle driven tire is disclosed having an undersized tire with a series of laterally oriented circumferentially spaced tabs extending radially off of the hub into a circumferentially extending recess in the tire to drivingly tie the tire to the hub.

18 Claims, 6 Drawing Sheets

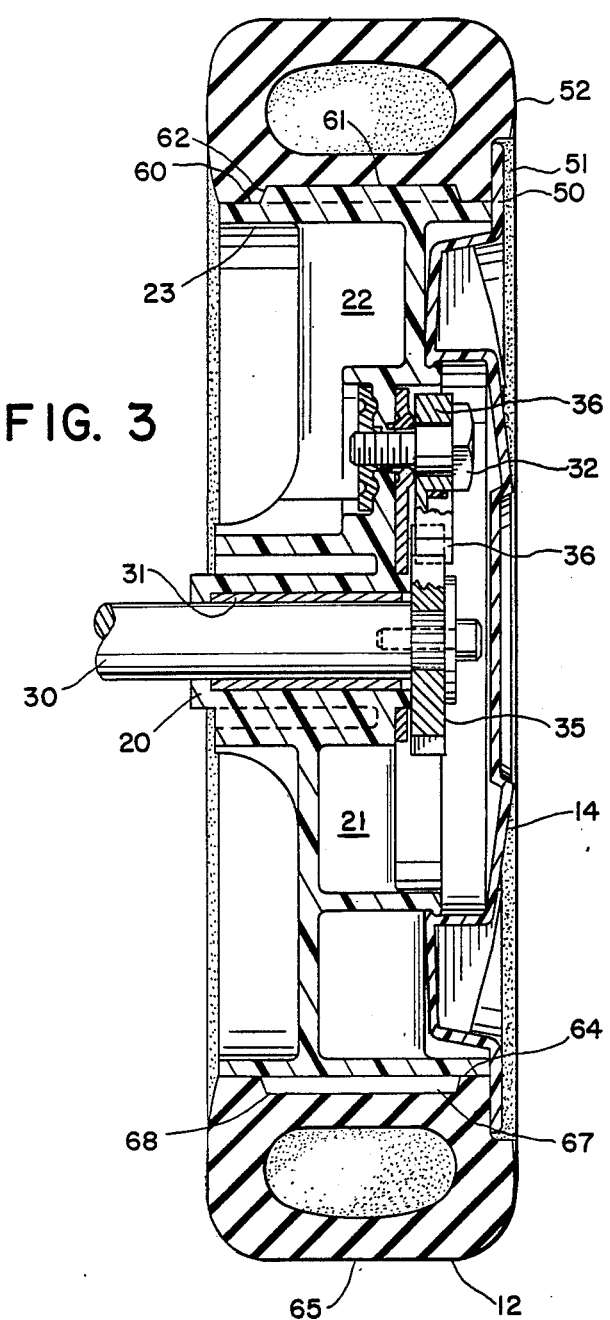

TIRE ASSEMBLY

This application is a continuation-in-part of U.S. patent application Ser. No. 203,020, filed June 1, 1988, entitled Improved Tire Assembly and now abandoned.

FIELD TO WHICH INVENTION RELATES

This invention relates to an improved interconnection between a hub and a surrounding tire. It is especially suitable for usage with lawn mowers and small garden tractors.

OBJECTS OF THE INVENTION

It is an object of this invention to improve the mechanical connection between a hub and a surrounding tire.

It is an object of this invention to increase the power transfer between a driven hub and a surrounding ground engaging tire.

It is an object of this invention to increase the reliability of the interconnection between a hub and surrounding tire.

It is an object of this invention to increase the longevity of tires.

Other objects and a more complete understanding of the invention may be had by referred to the following specification and drawings in which:

FIG. 3 is a central cross-sectional view of the hub and tire combination of FIG. 2 taken generally along lines 3—3 of that figure.

DETAILED DESCRIPTION

Figure 1:
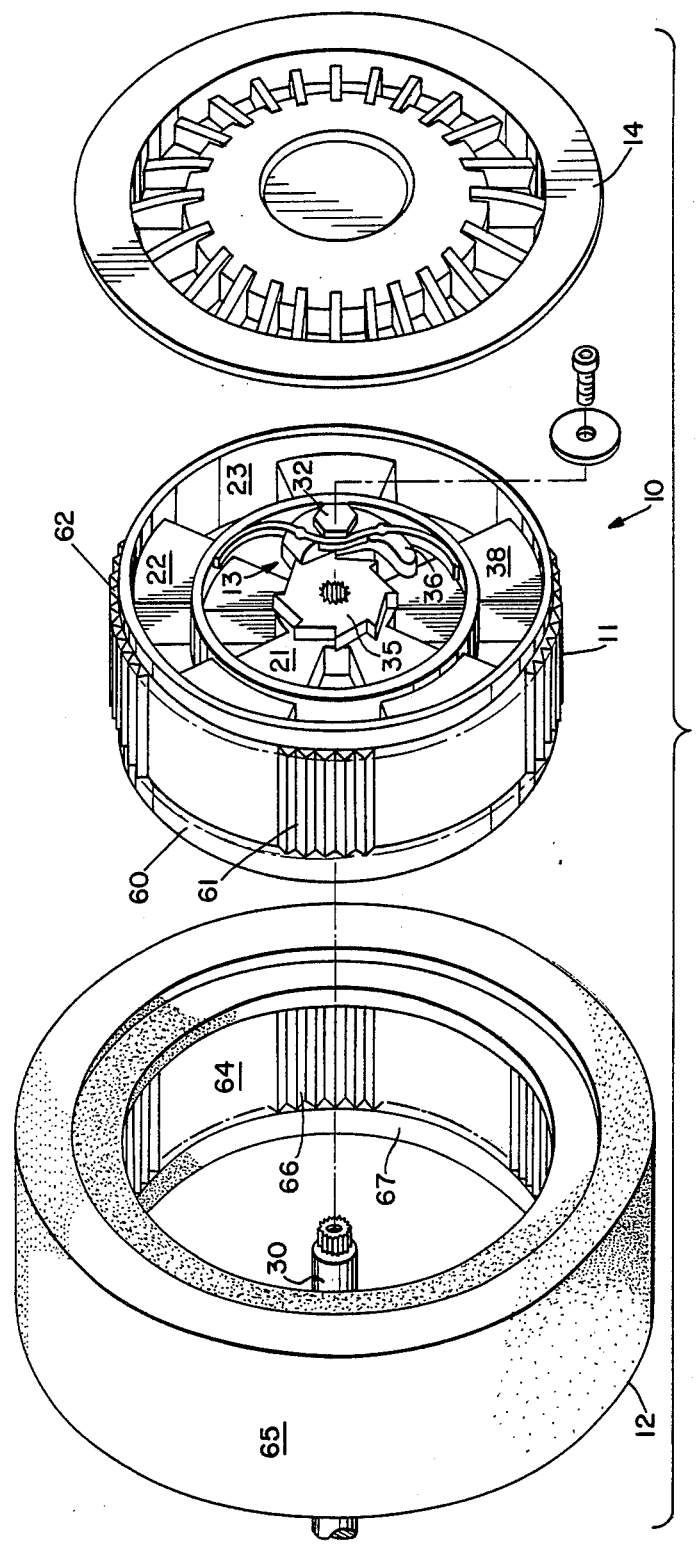
FIG. 1 is a perspective view of a separated tire assembly incorporating the invention of the application.
Figure 2:
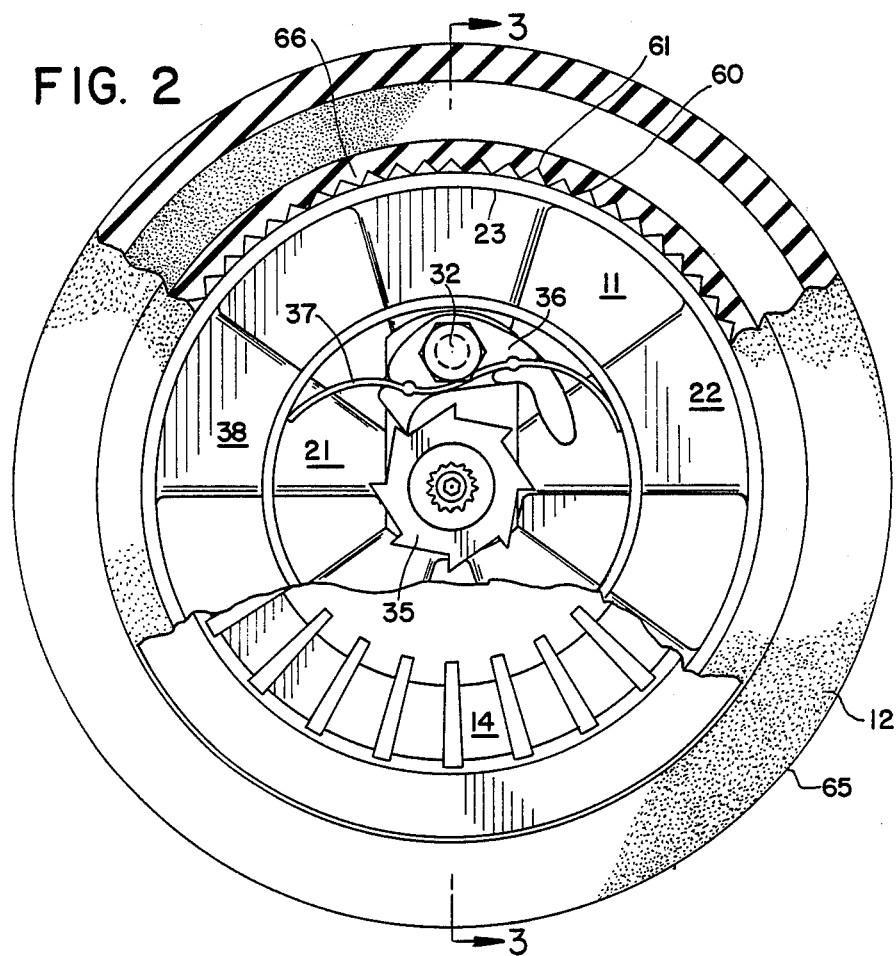
FIG. 2 is a front view of the hub and tire combination of the tire assembly of FIG. 1.
Figure 4:
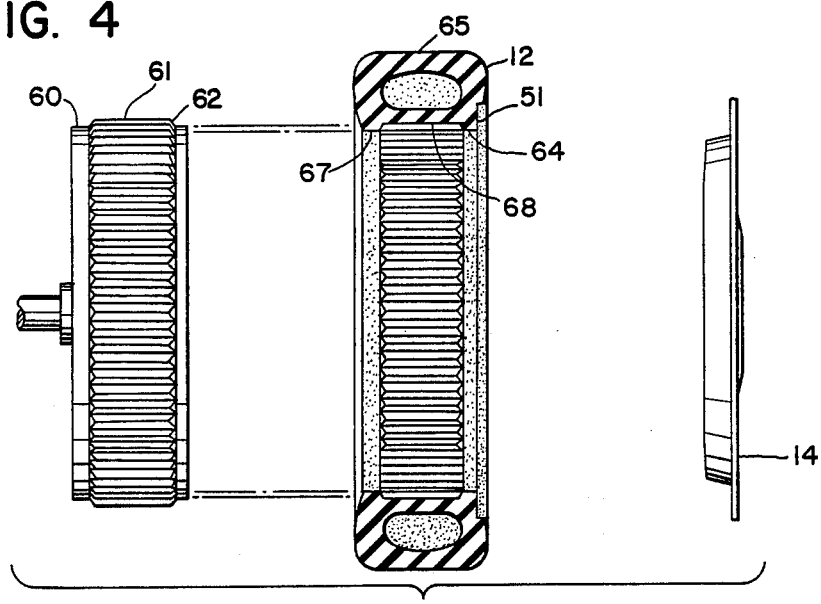
FIG. 4 is a central cross-sectional view of the hub and tire of FIG. 3 in a separated state.
Figure 5:
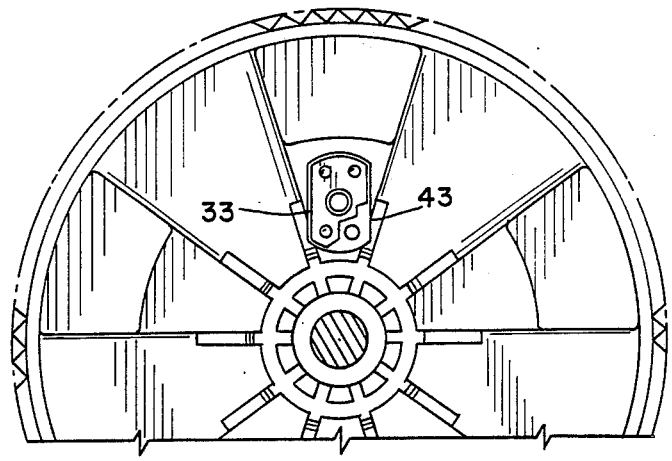
FIG. 5 is an enlarged sectional view of the nut piece holding the pivot bolt for the cam of the drive system of the tire of FIG. 1.
Figure 6:
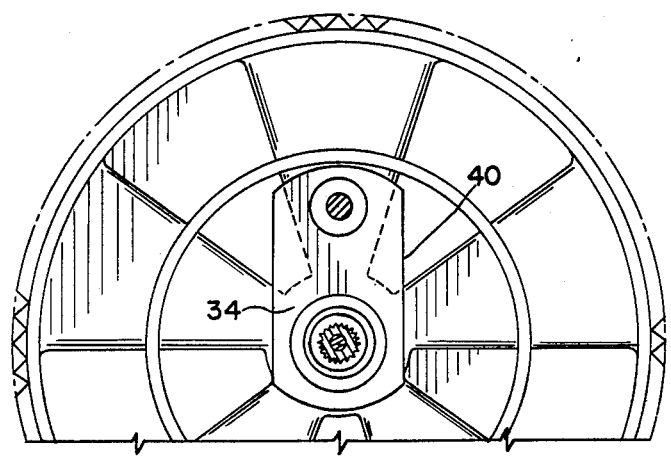
FIG. 6 is an enlarged sectional view of the reinforcing piece for the drive system of the tire of FIG. 1.

This invention relates to an improved tire assembly 10. In the preferred embodiment disclosed the assembly 10 includes a central hub or rim 11, a surrounding tire 12, a drive mechanism 13 and a hub cap 14.

The central hub 11 is a single piece injected molded plastic part having a central cylindrical axially extending bearing opening 20, a surrounding axially recessed drive cavity 21, a radial connection section 22 and an outer circumferential rim 23.

The central bearing opening 20 supports the tire assembly 10 onto the axle 30 of the associated vehicle (not shown). In the embodiment shown there is a lost-motion drive mechanism 13 (later described) between the axle 30 and the tire assembly 10. For this reason there are two sleeve bearings 31 between the axle 30 and hub 11. These bearings 31 support the tire assembly 10 to the vehicle while allowing the independent rotation o the tire assembly (subject to the operation of the later described drive mechanism 13). Ball or other bearings could also be utilized with or without a lost-motion drive connection if an independent rotation of the tire 12 is desired. In certain applications the hub 11 may be directly connected to the axle 30 for rotation therewith.

The drive cavity 21 is a cylindrical hollow recessed into one lateral side of the hub 11. The axle 30 extends into this hollow from the other lateral side of the hub 11. (This allows for an easier assembly and more cost effective design than the alternative of locating the drive mechanism 13 on the inside of the hub 11. It also allows for an efficient mounting for the later described hub cap 14.) A star shaped tooth gear 35 is located on the end of the axle 30 within the drive cavity 21. A series of matching spines on the outside of the axle 30 and on the inside of the gear 35 tie these two parts together for common rotation. The cam 36 is rotatively mounted to the hub 11 via a pivot bolt 32, a nut piece 33 and a reinforcing piece 34. To mount the cam 36 to the hub 11, the reinforcing piece 34 is located in a similarly sized recessed pocket 40 on one side of the hub 11 (the cam 36 side) with one part of the reinforcing piece 34 surrounding the axle hole in the hub 11 and a small smooth bore cylindrical extension 41 extending into a radially located hole 42 in the hub 11. The nut piece 33 is located in a nut piece sized recessed pocket 43 on the other side of the hub 11 with a threaded extension 44 extending into the radially located hole 42 in the hub 11. The sum of the lengths of the extension 41 of the reinforcing piece 34 and the threaded extension 44 of the nut piece 33 is slightly less than the thickness 39 of the hub 11 between these two pieces 33, 34. For this reason there is a slight gap 45 between them. Upon location of the reinforcing piece 34 and nut piece 33 the pivot bolt 32 is inserted through a hole in the cam 36 and the smooth bore of the reinforcing piece 34 to thread into the threads of the nut piece 33. The pivot bolt 32 is then tightened to about 75 inch pounds. Upon tightening part of the plastic of the hub 11 is extruded through the gap 45 to work its way up the threads of the pivot bolt 32 between the bolt 32 and the smooth bore 41 of the reinforcing piece 34. This extruded plastic 46 acts as a locknut for the pivot bolt 34, locking it into place. Upon tightening of the pivot bolt 32 the cam 36 is free to rotate about the pivot bolt 32. A small raised section 47 on the reinforcing piece 34 about the pivot bolt 32 facilitates this rotation both by fixing the protruding length of the bolt 32 to slightly more than the depth of the cam 36 and by raising a majority of the cam out of contact with the hub 11 and reinforcing piece 34.

A spring loaded toothed cam 36 within the cavity 21 to the hub 11 drivingly engages the teeth of the gear 35 when the gear 35 is rotated in one direction in respect to the hub 11 to rotatively connect the axle 30 to the hub 11. The cam 36 moves out of the way against the pressure of the spring when the gear 35 is rotated in the other direction in respect to the hub 11. In the embodiment shown the spring is a length of flexible, resilient plastic 37 extending between the cam 36 and hub 11. This drive connection, the gear 35 and cam 36, drivingly connects the tire assembly 10 to the axle 30 for drive and freewheeling movement therebetween. The direction of drive vs. lost motion interconnection is chosen to match the intended application. In the embodiment described the axle 30 is selectively rotated by an engine (not shown) for moving the vehicle forward. Therefore the drive connection is designed such that if the axle 30 is being rotated (forward drive on) the cam 36 is locked into the gear 35 to drivingly interconnect the hub 11 to the axle 30 (right wheel shown). If, during this drivingly interconnection one pushes the vehicle faster than the axle 30 is driving the tire assembly 10 the cam 36 moves away from the gear 35 to allow this increased forward speed (the axle 30 continues to rotate at its driven speed the while). If the axle 30 is not being rotated (forward drive off) the cam 36 can move away from the gear 35 to allow rotation of the tire 12 and thus manual forward movement. (In the embodiment shown, the cam 36 is locked to the gear 35 and thus rotates the axle 30 on manual rearward movement). The depth of the drive cavity 21 is such that upon assembly of the hub cap 14 (later described) onto the hub 11, the hub cap 14 insures that the gear 35 is in contact with the cam 36.

The radial connection section 22 connects the outer rim 23 to the central hub 11 of the assembly 10. In the preferred embodiment shown this radial connection section 22 includes a series of alternating axially stepped, radially extending triangular members 38. These triangular members 38 extend both radially and axially of the hub 11 to provide strength against radial (vehicle weight) and axial (side loads) forces. Other shaped connections are also possible to suit varying purposes. As previously discussed the reinforcing piece 34 and nut piece 33 are inset in recesses (40, 43 respectively) in the radial connection section 22 so as to connect the cam 36 to the hub 11.

The hub cap 14 shown covers the entire side of the hub 11. This provides a decorative appearance for the hub 11, allowing one to match a single tire assembly 10 to many different applications in an apparent custom manner at a very low cost (i.e. various models for Sears can have "Craftsman" (TM) printed on some rims, other models left blank, and still other models with a smaller diameter or no hub cap) thereby reinforcing the different image of the models of lawn mowers. In the preferred embodiment disclosed the hub cap 14 extends well beyond the outer edge 50 of the hub 11 into a recess 51 in the side of the tire 12. The fact that part 52 of the tire 12 is located radially outside the hub cap 14 limits the separation of the hub cap 14 from the hub 11 (for example as upon the impact of striking a curb or the peeling the hub cap off due thick grass). The fact that the hub cap 14 is in a recess 51 in the tire 12 also reduces the apparent height of the tire 12. This simulates a high aspect ratio tire (i.e. makes the tire appear to be lower with a larger diameter hub than it actually has). The diameter of the hub cap 14 can be varied if desired—for example just covering the drive cavity 21 instead of the whole rim 11. As previously discussed the hub cap 14 also serves a utilitarian purpose in protecting and retaining the drive assembly.

Figure 7:
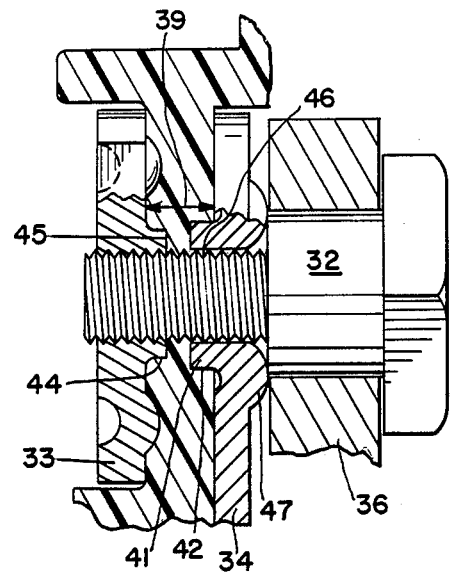
FIG. 7 is an enlarged side view through the pivot bolt for the cam of the drive system of the tire of FIG. 1.
Figure 9:
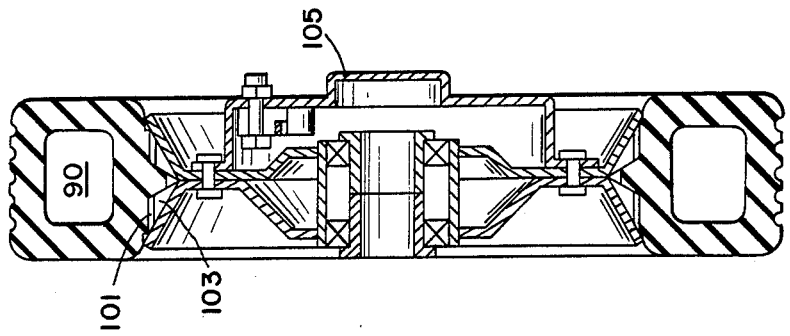
FIG. 9 is a central cross-sectional view of the prior art tire assembly of FIG. 8.
Figure 8:
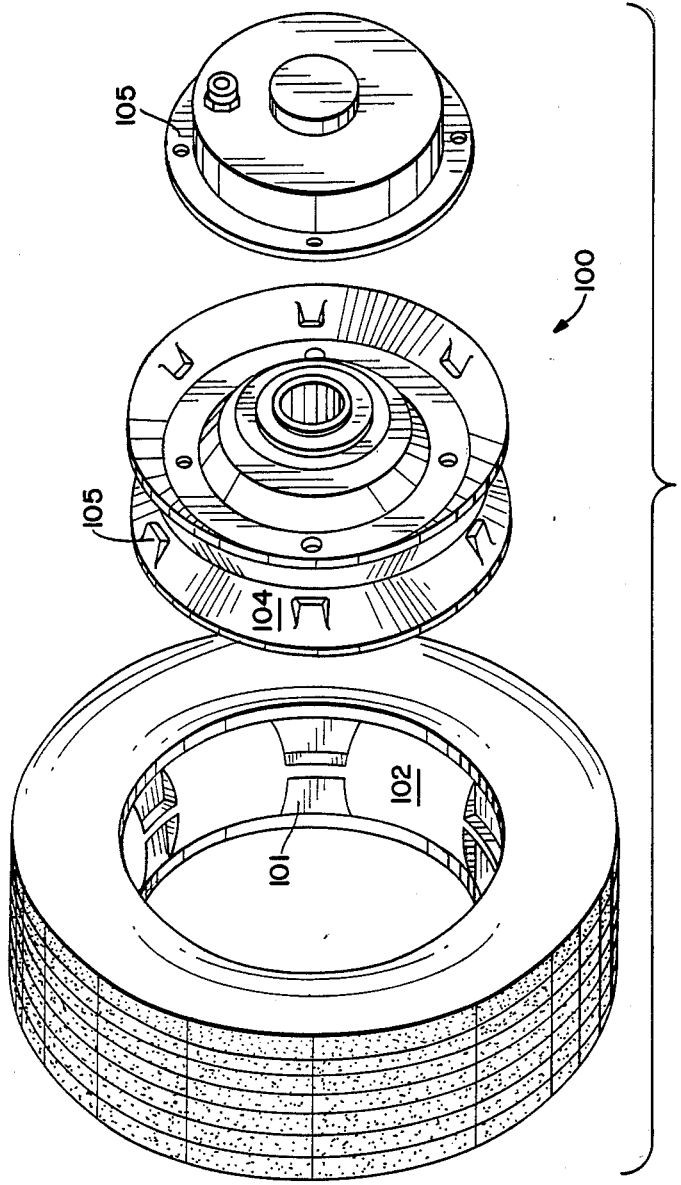
FIG. 8 is a perspective separated view of a prior art tire assembly.

The outer circumferential rim 23 of the hub 11 locks the tire 12 to the assembly 10. In most of the prior art the connection between the tire and rim is not precise. For example in the tire assembly 100 of FIGS. 7 and 8 a series of indentations 101 let into the slightly rounded inside circumference of the tire 102 are supposed to cooperate with a series of protrusions 103 extending outwardly from the outside of the angular surfaces of the rim 104 to tie the tire to the drum rim. The drive for the rim is within the hub cap 105, further separating the drive from the tire. In actual usage the indentations 101 are almost never aligned with the protrusions 103—During manufacture your regular employee will not stop to align these parts before assembly: In use the limited number of contact surfaces has difficulty with the power between rim and wheel. This is aggravated by the fact that on the application of sidewards forces on the tire (i.e. a sharp turn or attempting to pass across a hill) the tire separates slightly from the rim. Some measure of slipping is therefor expected, even through this same slipping soon causes the prior art assembly to become at least occasionally disfunctional.

In the invention of this present application the outer circumferential rim 23 is a flat, generally cylindrical shape 60 having a series of laterally oriented tabs 61 outwardly extending therefrom. These tabs 61 on the outer rim 23 cooperate with the tire 12 to unify the tire assembly 10 (as later described).

The preferred tabs 61 are generally triangular prism shaped protrusions extending a short distance radially outward of the cylinder 60. The axial edges 62 of the tabs 61 extend at a positive angle in respect to the cylinder 60, terminating a little way inside of the axial edges of the cylinder 60. The prism shape and positive angle facilitates assembly by allowing the natural resilience of the tire 12 to aid in alignment and in later retaining the tire 12 onto the hub 11 (any sidewards forces are transposed into outwards forces—forces that are more easily absorbed by the resiliency of the tire 12). The termination of the ends 62 of the tabs 61 within the confines of the cylinder 60 provides an area for tire sidewalls within the width of the rim 11. This causes the tire 12 to seat better. It is preferred that there be multiple tabs 61 spaced equally about the rim 23 at short distances. The multiplicity of the tabs 61 allows any forces between the tire 12 and hub 11 to be spread out—i.e. each tab 61 need only transfer a small force. This optimizes the transfer of forces. The diameter about the outside of the tabs 61 is preferably slightly less than the corresponding diameter of the tire 12 radially outwardly of the tabs 61 when such tire 12 is in place on the hub 11. With this dimensional relationship the lateral surfaces of the tabs 61 transfer the circumferential forces between the tire 12 and hub 11 without also interfering with the sidewall of the tire 12 to hub 11 interface later described.

The tire 12 surrounds the hub 11. The tire 12 itself is preferably a semi-pneumatic ring of rubber or other resilient material. It could also b unitary or otherwise. The outer surface 65 of the tire 12 is a traction surface for contact with the ground. The inner surface 64 of the tire 12 is designed to mate with the outer rim 23 of the hub 11. As shown in FIGS. 1 and 3, the outer rim 23 of the preferred embodiment has triangular prism tabs 61 extending off of the center portion of a cylinder 60. The preferred tire 12 to match this rim 23 has a recessed section 66 extending into the inner surface 64 of the tire 12 between two sidewall 67 portions.

The recessed section 66 of the tire 12 has a series of protrusions 68 extending towards the inner surface 64. The shape, number and spacing of these protrusions 68 is preferably selected to generally match the number and spacing of the tabs 61 (or multiples thereof). In the preferred embodiment shown these protrusions 68 are prism shaped to match the tabs 61 of the hub. As previously discussed the diameter of 64 at the base of the protrusions 68 (i.e. maximum diameter measured when the tire 12 is on the hub 11) is preferably a little more than the outer diameter of the hub 11 about the tabs 61 (i.e. maximum diameter of the hub 11) and the diameter of 64 at the apex of the protrusions 68 (i.e. minimum diameter measured when the tire 12 is on the hub 11) is also preferably a little more than the outer diameter of the rim 23 of the hub 11 (i.e. minimum diameter of the hub 11). With these diameters the surface 64 of the tire 12 will firmly seat next to the tabs 61 without interfering with the critical sidewall of the tire 12 to hub 11 interface later described. A clearance of about 0.030 inch is preferred (the air pocket in the tire 12 facilitates this by allowing the tire 12 to pull back over the protrusions 68—something a solid tire will not allow). Note that in the preferred embodiment shown the protrusions 68 in the surface 64 are generally prism shaped, extending at an angle from the maximum to minimum diameter of the surface 64. With this shape the tabs 61 will act to seat themselves in the valleys between the protrusions 68. This facilitates the assembly of the tire.

The sidewall 67 portions serve to hold the tire 12 onto the rim 11. The sidewall 67 portions of the tire 12 preferably have an inner axial surface to match the ends 62 of the tabs 61 and an inner diameter slightly smaller than the outer diameter of the rim 23 of the hub 11 ($\frac{1}{8}$" to 3/16" smaller with a 8" diameter hub shown measured when the tire 12 is off the hub 11). The depth of the tire 12 (height of the sidewall 67 portions) is significant in respect to the width of the tire 12. (Depth of 50% or more of tire 12 width is preferred). The sidewall 67 portions are also relatively hard or stiff (the preferred tire 12 has a hardness above durom ·A=75 and more preferably between 82 to 92). The depth of the tire 12 acts with the hardness to give side pullaway strength to the sidewall 67 portions. The air cavity between the two sidewall portions aids the interconnection by separating the forces between the sidewall 67 portions (i.e. each act on its own separate behalf). With this diameter and hardness the sidewall 67 portions of the tire 12 securely hold the tire on to the hub 11. Note that with the preferred semi-pneumatic tire 12 the air pocket 16 extending circumferentially within the tire increases the relative pressure on the sidewall 67 by reducing an intermediate passage of forces to further strengthen the critical sidewall 67—hub joint against separation.

As previously discussed the design of the assembly 10 in combination with the tire serves to ease assembly of the tire as well as providing a natural strength to the finished assembly. To assemble the tire the diameter of a sidewall 67 of the tier 12 is expanded to fit about the tabs 61 and the hub 11 is slipped into the tire 12. The air pocket in the tire 12 between the sidewall 67 portions facilitates this operation by allowing some flexing between and individuality for each sidewall 67 portion. After the hub 11 is within the tire 12, the expanded sidewall 67 will slip over the downward angle 62 of the tab 61 to facilitate the final seating of the hub 11 into the tire 12. Due to the augulation (and multiplicity) of the protrusions 68 the tire 12 will be biased towards proper seating on the hub 11. It is not therefor necessary that the tabs 61 be in alignment with the protrusions 68; alignment will occur automatically soon after assembly (once aligned the tabs 61 and protrusions 68 lock the tire to the hub against further rotation). Once the tire 12 and hub 11 are preliminarily assembled one can install the tire assembly 10 onto the associated vehicle (paying primary attention only to the drive connection re: direction of rotation).

Although this invention has been described in its preferred form with a certain degree of particularity, it is to be understood that numerous changes could be made without departing from the invention as claimed. For example both the tabs 61 and projections 68 in the preferred embodiment are triangular in cross-section and equal in number. The triangle cross-section for at least one of the tabs 61 and projections 68 is preferred because this shape is initerently self-seating. The equal number is preferred for it spreads the forces between hub 11 and tire 12 over the maximum area. Other shapes and/or numbers are also possible for example 100 rectangular, skinny flat tabs with 200 prism shaped projections or 1 tab and 1 projection. The choice depends on the application and intent of the designer.

What is claimed is:

1. In a tire assembly having a tire with an inner surface and a rim with an outer surface having a diameter and an axial width, an improvement comprising tabs, said tabs extending radially outwardly off of the rim about the outer surface thereof, said tabs having a length, said length of said tabs being less than the axial width of the rim, two sidewalls on the inner surface of the tire, said two sidewalls having an inner diameter measured when the tire is not mounted on the rim, projections, said projections extending radially inwardly on the inner surface of the tire about the inner surface thereof between said two sidewalls, said tabs being in contact with said projections drivingly connecting the rim to the tire, said two sidewalls extending off of the inner surface of the tire on either side of said tabs, and said diameter of said two sidewalls being less than the diameter of the rim so as to elastically fit thereon.

2. The tire assembly of claim 1 characterized in that said projections are prism shaped.

3. The tire assembly of claim 1 characterized by the addition of a lateral cavity in the rim about the axis thereof, a drive, said drive being located in said lateral cavity, a hub cap, and said hub cap closing said drive in said lateral cavity.

4. The tire assembly of claim 1 wherein the tire has a hardness and said hardness being greater than durom. A·75.

5. The tire assembly of claim 1 characterized by the addition of a hubcap, said hubcap having an outer diameter, means to affix the hubcap to the rim, and said outer diameter of said hubcap being greater than the inner diameter of the tire.

6. The tire assembly of claim 5 characterized in that the tire has a sidewall, said sidewall having a recess, and said hubcap fitting into said recess in said sidewall of the tire.

7. In a tire assembly having a tire with an inner surface and a rim with an outer surface having a diameter and an axial width, the rim being rotatively mounted on an axle, and the axle having a gear at the end thereof, an improvement comprising tabs, said tabs extending radially outwardly off of the rim about the outer surface thereof, said tabs having a length, said length of said tabs being less than the axial width of the rim, two sidewalls on the inner surface of the tire, said two sidewalls having an inner diameter measured when the tire is not mounted on the rim, projections, said projections extending radially inwardly on the inner surface of the tire about the inner surface thereof between said two sidewalls, said tabs being in contact with said projections drivingly connecting the rim to the tire, said two sidewalls extending off of the inner surface of the tire on either side of said tabs, and said diameter of said two sidewalls being less than the diameter of the rim so as to elastically fit thereon, the rim driven by the gear through a pivoting cam mounted on the rim by a pivot bolt, and characterized in that the pivot bolt connects to the rim via a hole in the rim, a reinforcing piece, said reinforcing piece having a hole, said reinforcing piece being located on one side of the rim with said hole of said reinforcing piece being in alignment with the hole in the rim, a nut piece, said nut piece having a threaded hole, said nut piece being located on the other side of the rim with said threaded hole of said nut piece being in alignment with the hole in the rim and said pivot bolt extending from said one side of the rim through said hole in said reinforcing piece and the hole in the rim to engage said threaded hole in said nut piece so as to mount the pivot bolt to the rim.

8. A tire assembly comprising a tire, said tire having hardness, a recess and two sidewalls of a certain diameter on the inner surface thereof, said certain diameter of said two sidewalls measured when said tire is off said rim, said hardness of said tire being greater than durom A·75, projections, said projections extending off of said tire within said recess throughout the circumference of said recess, a rim, said rim having an outer surface, said outer surface having a width and a diameter, said diameter of said rim being greater than said certain diameter of said two sidewalls of said tire, tabs, and said tabs having a length, said length of said tabs being less than said width of said rim, said tabs extending radially off of said outer surface of said rim intermediate of said width of said rim throughout the circumference of said rim, and said tabs being within said recess of said tire between said sidewalls.

9. The tire assembly of claim 8 characterized in that said projections are prism shaped.

10. The tire assembly of claim 8 characterized in that said sidewalls define outer edges for said recess, said tabs have ends and a top edge, and said ends of said tabs and said outer edges of said recess extending at an angle in respect to said top edge of said tabs.

11. The tire assembly of claim 8 characterized by the addition of a lateral cavity in the rim about the axis thereof, a drive, said drive being located in said lateral cavity, a hub cap, and said hub cap closing said drive in said lateral cavity.

12. The tire assembly of claim 8 characterized by the addition of a hubcap, said hubcap having an outer diameter, means to affix the hubcap to the rim, and said outer diameter of said hubcap being greater than the inner diameter of the tire.

13. The tire assembly of claim 12 characterized in that the tire has a sidewall, said sidewall having a recess, and said hubcap fitting into said recess in said sidewall of the tire.

14. A tire assembly comprising a rim, a tire, said tire having hardness, a recess and two sidewalls of a certain diameter on the inner surface thereof, said certain diameter of said two sidewalls measured when said tire is off the rim, said rim being rotatively mounted on an axle, the axle having a gear at the end thereof, said hardness of said tire being greater than durom A·75, projections, said projections extending off of said tire within said recess throughout the circumference of said recess, a rim, said rim having an outer surface, said outer surface having a width and a diameter, said diameter of said rim being greater than said certain diameter of said two sidewalls of said tire, tabs, and said tabs having a length, said length of said tabs being less than said width of said rim, said tabs extending radially off of said outer surface of said rim intermediate of said width of said rim throughout the circumference of said rim, said tabs being within said recess of said tire between said sidewalls, the rim is driven by the gear through a pivoting cam mounted on the rim by a pivot bolt, and characterized in that the pivot bolt connects to the rim via a hole in the rim, a reinforcing piece, said reinforcing piece having a hole, said reinforcing piece being located on one side of the rim with said hole of said reinforcing piece being in alignment with the hole in the rim, a nut piece, said nut piece having a threaded hole, said nut piece being located on the other side of the rim with said threaded hole of said nut piece being in alignment with the hole in the rim and said pivot bolt extending from said one side of the rim through said hole in said reinforcing piece and the hole in the rim to engage said threaded hole in said nut piece so as to mount the pivot bolt to the rim.

15. A tire assembly comprising a tire, said tire having a hardness, a circumferentially extending recess and two adjoining sidewalls on the inner surface thereof, said hardness of said tire being greater than durom. A·75, said recess having a width, said sidewalls each having an inner surface a minimum radius from the center of said tire, prism shaped projections, said projections extending inwardly off said tire in said recess for the entire diameter of said tire, said projections having a valley each with a distance from said inner surface of said sidewalls, a rim, said rim having a flat outer circumferential surface, the diameter of said outer surface of said rim being greater to said minimum radius of said sidewalls, said outer surface having a width, tabs, said tabs having a length and a height, said length of said tabs being less than said width of said outer surface of said rim and substantially equal to said width of said recess, said tabs extending off of said outer surface of said rim intermediate of said width of said outer surface of said rim for the entire diameter of said rim, said height of said tabs of said rim being less than said distance of said valley of said projections, and said tabs being within the recess of said tire between the sidewalls in contact with said valleys of said projections.

16. A pivot bolt mounting for a rim rotatively mounted on an axle, the axle having a gear at the end thereof, and the rim being driven by the gear through a pivoting cam mounted on the rim by a pivot bolt, and said mounting comprising a hole in the rim, a reinforcing piece, said reinforcing piece having a hole, said reinforcing piece being located on one side of the rim with said hole of said reinforcing piece being in alignment with the hole in the rim, a nut piece, said nut piece having a threaded hole, said nut piece being located on the other side of the rim with said threaded hole of said nut piece being in alignment with the hole in the rim and said pivot bolt extending from said one side of the rim through said hole in said reinforcing piece and the hole in the rim to engage said threaded hole in said nut piece so as to mount the pivot bolt to the rim.

17. In a tire assembly having a pre-molded tire with an inner surface and a rim with an outer surface having a diameter and an axial width, an improvement comprising tabs, said tabs extending radially outwardly off of the rim about the outer surface thereof, said tabs having a length, said length of said tabs being less than the axial width of the rim, two sidewalls on the inner surface of the tire about the inner surface thereof between said two sidewalls, said tabs being in contact with said projections drivingly connecting the rim to the tire, said two sidewalls extending off of the inner surface of the tire on either side of said tabs, and said diameter of said two sidewalls being less than the diameter of the rim so as to elastically fit thereon.

18. The tire assembly of claim 17 characterized in that said diameter of said two sidewalls is substantially within the range ⅛" to 3/16" smaller than the diameter of the rim.

* * * * *